United States Patent [19]
Mori et al.

[11] 3,990,086
[45] Nov. 2, 1976

[54] SHUTTER CONTROL CIRCUIT FOR CAMERAS

[75] Inventors: Chiharu Mori; Masahiro Kawasaki, both of Tokyo

[73] Assignee: Asahi Kogaku Kogyo Kabushiki Kaisha, Japan

[22] Filed: May 13, 1974

[21] Appl. No.: 469,526

[30] Foreign Application Priority Data
May 15, 1973 Japan............................ 48-56233[U]

[52] U.S. Cl................................. 354/51; 354/50; 354/60 R
[51] Int. Cl.².......................................... G03B 7/08
[58] Field of Search...................... 354/50, 51, 60 R

[56] References Cited
UNITED STATES PATENTS

| | | | |
|---|---|---|---|
| 3,625,124 | 12/1971 | Miyakawa | 354/51 |
| 3,641,890 | 2/1972 | Ono | 354/51 |
| 3,695,157 | 10/1972 | Miyakawa | 354/51 |
| 3,821,757 | 6/1974 | Kobori | 354/51 |
| 3,883,882 | 5/1975 | Mori | 354/51 |

*Primary Examiner*—Russell E. Adams, Jr.
*Attorney, Agent, or Firm*—Steinberg & Blake

[57] ABSTRACT

A shutter control circuit for a camera including a timing circuit for measuring the exposure time during which the shutter will remain open. The shutter control circuit further includes a switching circuit having a switching transistor with a collector, coupled to the timing circuit, an emitter and a base. A first constant voltage source is connected to the emitter of the switching transistor. A manual exposure control circuit includes an emitter follower circuit with a transistor complementary to the switching transistor. A second constant voltage source is also included in the manual exposure control circuit and is coupled to the emitter follower circuit. The voltage level of the second constant voltage source is capable of being manually set in accordance with the desired shutter time. The output of the emitter follower circuit is coupled to the base of the switching transistor. The shutter control circuit can include an automatic exposure control circuit which automatically determines the exposure time based upon exposure determining factors. A selection circuit is interconnected between the base of the switching transistor and between both the manual and automatic exposure control circuits for selecting one of said last two circuits to be interconnected with the switching circuit.

11 Claims, 1 Drawing Figure

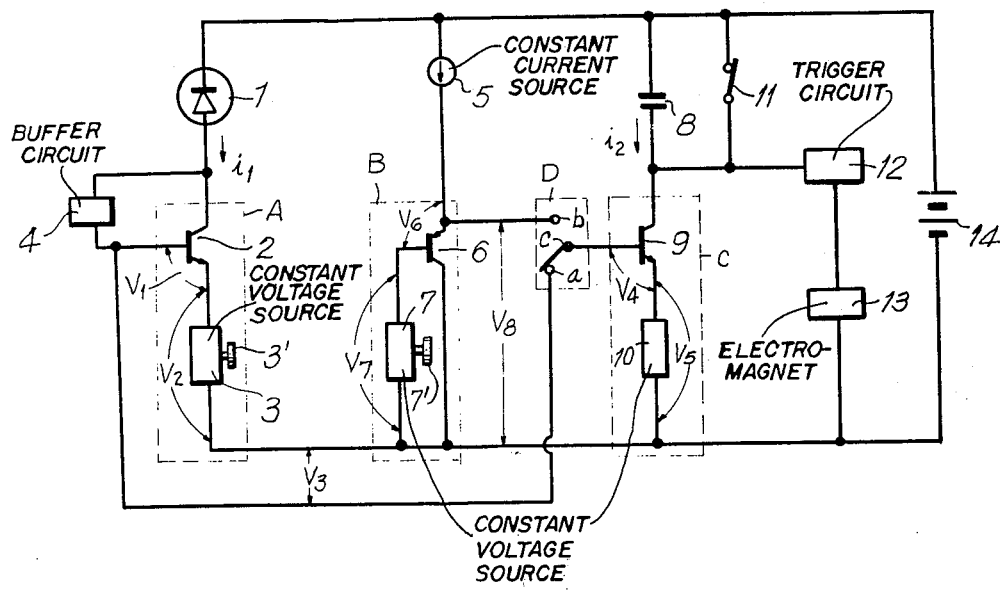

SHUTTER CONTROL CIRCUIT FOR CAMERAS

BACKGROUND OF THE INVENTION

The present invention relates to cameras.

In particular, the present invention relates to a shutter control circuit for cameras.

Many cameras now include automatic exposure control circuits which automatically determine the exposure time during which the shutter will remain open. Such exposure time is automatically determined based upon exposure determining factors such as the amount of illumination at the object to be photographed, the film sensitivity, and the aperture opening. The automatic exposure determining circuitry usually produces a current which is a function of the automatically determined exposure time. The automatic exposure control circuit is then connected to a charging circuit such that the current charges capacitive elements in the charging circuit which, upon reaching a predetermined voltage level, trigger a switch which closes the shutter, thereby terminating the exposure.

In addition to having the automatic exposure control circuitry in the camera, it is generally desired to also include a manual shutter control circuit. Such manual shutter control circuits are utilized when a specific exposure time is desired regardless of the time which would automatically be determined. The cameras therefore include various types of manual shutter control circuits in combination with the automatic exposure control circuits. Such manual shutter control circuits are generally provided with their own charging circuit, separate from the charging circuit used with the automatic exposure control circuits. A selection circuit is then arranged which selects one of the charging circuits to be utilized in connection with closing the shutter. In such camera arrangements however, the switching generally involves high impedance elements in the circuit. It is therefore necessary to include additional circuit elements to avoid leakage currents which become significant due to the selecting operation taking place at a high impedance point of the circuitry. Therefore, known arrangements cannot provide as effective and as accurate switching, between the manual and the automatic exposure control circuitry, as is desired.

SUMMARY OF THE INVENTION

It is accordingly a primary object of the present invention to provide a circuit for controlling the shutter of a camera in a manner which will avoid the aforementioned drawbacks.

In particular, it is an object of the present invention to provide a shutter control circuit which includes a manual shutter control circuit and an automatic exposure control circuit and selection circuitry which is connected to a low impedance point of the circuit.

In particular, it is an object of the present invention to provide a shutter control circuit including both manual shutter control circuitry and automatic exposure control circuitry having symmetrical circuit arrangements to achieve very stable shutter control despite variations in the source voltages and ambient temperatures.

In particular, it is an object of the present invention to provide a manual exposure control circuit in a shutter control circuit having an automatic exposure control circuit, and to effect a selection operation therebetween to remove the influence of leakage current upon the selection operation circuitry.

Thus, it is an object of the present invention to provide a circuit of the above type which is far more accurate than previously known similar circuits while at the same time being more reliable in its operation.

According to the invention, the camera shutter control circuit includes timing circuit means which controls the exposure time and at the conclusion thereof terminates the exposure by closing the shutter. Switching circuit means includes a switching transistor having a collector, coupled to the timing circuit, an emitter, and a base. A first constant voltage source means is connected to the emitter of the switching transistor. A manual exposure control circuit means includes an emitter follower circuit which has a transistor complementary to and compensating the switching transistor. A second constant voltage source means is included in the manual exposure control circuit and is coupled to the emitter follower circuit. The voltage level of the second constant voltage source means is capable of being manually set in accordance with the desired exposure time. The output of the emitter follower circuit is coupled to a low-impedance point, specifically the base of the switching transistor.

The shutter control circuit can further include an automatic exposure control circuit means which automatically determines the exposure time based upon exposure determining factors such as the amount of illumination at the object to be photographed, the sensitivity of the film and the aperture opening. A selection circuit means is interconnected between the base of the switching transistor and both the manual and automatic exposure control circuit means and couples one of the exposure control circuits into electrical connection with the switching circuit.

BRIEF DESCRIPTION OF THE DRAWING

The invention is illustrated by way of example in the accompanying drawing which forms part of this application and which is a schematic circuit diagram of the shutter control circuit in accordance with this invention.

DESCRIPTION OF THE PREFERRED EMBODIMENT

With reference to the accompanying drawing, the shutter control circuit according to the invention includes a circuit section A enclosed within the dotted line and forming part of the automatic exposure control circuit; a circuit section B forming part of the manual exposure control circuit; a circuit section C forming part of the switching circuit; and a circuit section D forming part of the selection circuit.

The automatic exposure control circuit includes a photoelectric light receiving element 1 which receives light from the object to be photographed and through a photoelectric conversion characteristic produces a photoelectric current $i_i$ which is proportional to the illumination at its light receiving surface. The photoelectric element can typically be a photodiode included externally or internally of the camera. The photoelectric element 1 is interconnected to the circuit section A which includes a transistor 2 having its collector coupled to the photoelectric element and receiving the photoelectric current. A constant voltage source 3 is connected to the transistor emitter and a buffer circuit 4 interconnects the collector and the base of the transistor providing the bias current for the transistor. The constant voltage source 3 can be manually set by the schematically illustrated manually operable adjusting means 3' at a voltage level depending upon exposure determining factors such as the lens diaphragm aperture value and the film sensitivity value. The automatic exposure control circuit is connected across a battery source 14.

The switching circuit includes a transistor 9 having a constant voltage source 10 connected to the emitter of the transistor 9. The source 10 is set at a given voltage level by the manufacturer in accordance with the characteristics of the circuit. The collector of transistor 9 is connected to a timing circuit including a timing capacitor 8 and, in parallel therewith, a normally closed timing switch 11. The timing circuit includes the control circuitry for closing the shutter at the end of the exposure time. This circuitry comprises a trigger circuit 12 which controls an electromagnet 13. In a known way, the trigger circuit 12 will cause the electromagnet 13 to release the trailing shutter curtain, thereby closing the shutter and terminating the exposure. The switching circuit, in series with the timing capacitor 8, is placed in parallel across the battery source 14.

The selection circuit is shown as a double pole single throw switch having two contact terminals $a$ and $b$ and a switching arm connected to the base of transistor 9 at point $c$.

The operation of the automatic exposure control circuitry for controlling the exposure time is as follows:

Light from the object to be photographed reaches the photoelectric element 1, through the photographic lens systems, for example, and is converted by the photodiode into the photoelectric current $i_i$ proportional to the illumination at the light receiving surface. The transistor 2 is self-biased from its collector to its base through the buffer circuit 4 so that the collector current of the transistor 2 becomes equal to the photoelectric current $i_i$. The base to emitter voltage $V_1$ of the transistor 2 will therefore be proportional to the logarithmic value of the photoelectric current $i_i$ as a result of the internal diode characteristic of the transistor across its PN junction. The illumination at the light receiving surface of the photoelectric element will have a direct proportional relationship to the luminance B of the object to be photographed. Furthermore, the luminance B of the object to be photographed varies in accordance with a geometrical progression of 2. As a result, the base emitter voltage $V_1$ will vary linearly with respect to the luminance B. In addition, it will also vary linearly in proportion to the APEX indication value $B_v$ of the luminance of the object B.

The voltage $V_2$ across the constant voltage source 3 is set at a level which is proportional to the exposure determining factors such as film sensitivity and the diaphragm aperture value. The film sensitivity S can be represented by its APEX indication value $S_v$ and the diaphragm aperture value A can be represented by its APEX indication value $A_v$. The voltage level $V_2$ is therefore set proportional to $S_v-A_v$. The circuit is so arranged that the transfer characteristics of the voltage source 3 corresponds to the transfer characteristics of the base-emitter voltage $V_1$. That is, the output voltage variation $V_2$, corresponding to a unit variation in the setting $S_v-A_v$, is equal to the voltage variation in the base-emitter voltage $V_1$ corresponding to its unit variation in $B_v$. As a result, the base voltage $V_3$ of transistor 2 will be at a level proportional to $B_v+S_v-A_v$. However, this last mentioned value is equal to $T_v$ which is the APEX indication value of the exposure time T. Thus, the base voltage $V_3$ will be at a level which is proportional to the exposure time T.

The base voltage $V_3$, of transistor 2, is connected to the base of the switching transistor 9 through the selection circuit D by means of the terminals $a-c$. The base voltage $V_3$ will therefore cause voltage $V_4$ to be developed across the base to emitter junction. The current $i_2$ in the collector is therefore developed in accordance with the diode characteristic of the transistor 9 developed at the base to emitter PN junction. The voltage $V_5$ of the constant voltage source 10 is set at a level such that the timing charging current $i_2$ will be a proper current for closing the shutter, taking into consideration the circuit design and the various components in the circuit. The current $i_2$ will therefore correspond to the exposure time. The current $i_2$ will be used to charge the capacitor 8 to determine the exposure time and to cause the shutter to close at the conclusion of such exposure time. The larger the current $i_2$, the shorter will be the exposure time T and, inversely, the smaller the value of the current $i_2$, the longer will be the exposure time T. Thus, the timing charging current $i_2$ will be proportional to the luminance B of the object and inversely proportional to the exposure time T.

When the exposure is commenced, the front curtain of the shutter, such as a focal plane shutter, will be released to open the shutter. Simultaneously, the normally closed timing switch 11 is opened, thereby charging the timing capacitor 8 to a preset constant voltage level. The charging current $i_2$ then passes through the capacitor and, when a predetermined voltage level is reached, the trigger circuit 12 will cause the electromagnet 13 to release the trailing shutter curtain, thereby closing the shutter and terminating the exposure.

In addition to the automatic exposure control circuit, described above, the shutter control circuit of this invention includes a manual exposure control circuit. The manual exposure control circuit includes the circuit section B having an emitter follower circuit including a transistor 6 arranged to be complementary to the transistor 9 and therefore arranged in a compensating manner. A constant current source 5 is connected to the emitter of transistor 6 thereby providing the emitter follower circuit with a voltage gain $G_v$ equal to 1. A constant voltage source 7 is connected to the base of the transistor 6. The constant voltage source 7 has a circuit construction similar to the constant voltage source 10. Constant voltage source 7 is capable of being set according to the manually set exposure time, by way of the schematically illustrated manually operable adjusting means 7', in such a manner that it develops an output voltage $V_7$ which is proportional to the APEX indication value $T_v$ of the desired exposure time. The transfer characteristics of the voltage source 7 is equal to the transfer characteristic of the voltage source 3. That is to say, a variation of the output voltage $V_7$ corresponding to a unit variation in the value $T_v$, is equal to a variation in the output voltage $V_2$ corresponding to a unit variation in $S_v-A_v$. Because of the unity voltage gain, the output voltage $V_8$ of the emitter follower will also correspond to $T_v$. By means of the selection circuit D, the emitter of the transistor 6 is coupled to the base of the switching transistor 9 through the terminals $b-c$. This will apply the voltage $V_8$, corresponding to the value $T_v$ representing the desired exposure time, to the base of the switching transistor 9. The switching transistor 9 will then develop a current $i_2$ proportional to the exposure time which will then control the timing circuit and close the shutter.

As a result of this circuitry, the selection circuit can either couple the automatic exposure control circuit A to the switching circuit C through contact *a*, or alternately, the manual exposure control circuit B through contact *b*. Furthermore, the automatic exposure control circuit can be matched with the manual shutter control circuit. By specifying a particular value $T_v$, the constant voltage source 7 or the constant current source 5 can be adjusted such that the voltage $V_3$ corresponding to a value $T_v$ from the automatic exposure control circuit becomes equal to the voltage $V_8$ also corresponding to $T_v$ from the manual exposure control circuit.

With the arrangement as herein described, a single charging circuit is utilized for both the automatic and manual exposure control circuitry which is coupled to the switching circuit. The selecting operation takes place at the base terminal of transistor 9 which is a low impedance point. Therefore, the influence of the leakage current on the selecting operation components can be ignored even when a long exposure time is set which results in a very small current $i_2$. The circuit in accordance with this invention therefore provides an improved stabilized shutter operation under numerous types of environments including high humidity. Furthermore, since both the automatic and manual exposure control circuitry have symmetrical configuration with respect to each other, the present invention provides excellent temperature characteristics and excellent stability even with voltage variations.

What is claimed is:

1. In a camera shutter control circuit, timing circuit means for participating in the determination of exposure time, switching circuit means including a switching transistor having a collector, an emitter, and a base, and said switching circuit means also including a first constant voltage source means connected to said emitter, manual exposure control circuit means including an emitter-follower circuit, having a transistor complementary to said switching transistor, a second constant voltage source means coupled to said emitter-follower circuit, and manually operable means connected to said second voltage source means for setting the voltage level of said second constant voltage source means for setting the voltage level of said second constant voltage source means in accordance with the desired exposure time, said emitter-follower circuit having an output, automatic exposure control circuit means for automatically determining the exposure time based upon exposure-determining factors, and selection circuit means interconnected between the base of said switching transistor and said automatic exposure control circuit means as well as said output of said emitter-follower circuit of said manual exposure control circuit means for selectively coupling either the latter output or said automatic exposure control circuit means to said base of said switching transistor, said base of said switching transistor having a base terminal connected to said selection circuit means and forming a low impedance point at which one or the other of said exposure control circuit means is selectively connected through said selection circuit means to said switching circuit means and through the latter to said timing circuit means.

2. The combination of claim 1 and wherein said first and second constant voltage source means respectively have similar circuit constructions.

3. The combination of claim 1 and wherein said emitter-follower circuit further includes a constant current source means, said complementary transistor having a collector coupled to said constant current source means, an emitter serving as the output of said emitter-follower circuit, and a base coupled to said second constant voltage source means.

4. The combination of claim 1 and wherein said timing circuit means includes, in parallel combination, capacitor means and normally closed switch means which opens upon commencement of the exposure time to permit the collector current of said switching transistor to charge said capacitor means.

5. The combination of claim 4 and wherein said timing circuit means further comprises trigger means coupled to and responsive to the charging of said capacitor means and shutter closing means energized by said trigger means for terminating the exposure when said capacitor means charges to a predetermined voltage.

6. The combination of claim 1 and wherein said automatic exposure control circuit means includes photoelectric means responsive to the illumination at the object to be photographed, control transistor means, having a collector coupled to said photoelectric means, an emitter and a base, a third constant voltage source means connected to the emitter of said control transistor means, and buffer means coupling the base and collector of said control transistor means for biasing said control transistor means, the base of said control transistor means being coupled to said selection circuit means, and manually operable means connected to said third constant voltage source means for setting third constant voltage source means in accordance with exposure determining factors including film sensitivity and aperture opening.

7. The combination of claim 6 and wherein said first, second and third constant voltage source means have their respective transfer functions equal.

8. The combination of claim 6 and wherein said control transistor means and said switching transistor are NPN type transistors and said complementary transistor is a PNP type transistor.

9. The combination of claim 1 and wherein said selection circuit means is a single pole double throw type switch.

10. In a camera shutter control circuit, timing circuit means for contributing toward determination of exposure time, switching circuit means electrically connected to said timing circuit means for operating said timing circuit means, said switching circuit means having a low impedance point, manual exposure control circuit means for manually controlling the exposure time, automatic exposure control circuit means for automatically controlling the exposure time, and selection circuit means interconnected between said manual and automatic exposure control circuit means and said low impedance point for selectively connecting one or the other of said exposure control circuit means to said low impedance point, said switching circuit means including a switching transistor, and said selection circuit means being connected to said switching circuit means at a base of said switching transistor, said base of said switching transistor having a base terminal which forms said low impedance point, said switching circuit means including a first constant voltage source means and said switching transistor being coupled between said timing circuit means and said first constant voltage source means, said manual exposure control circuit means including an emitter-follower circuit having a transistor complementary to said switching transistor, a second constant voltage source means coupled to said emitter-follower circuit, and manually operable means connected to said second constant voltage source means for setting the voltage level of said second constant voltage source means in accordance with the desired exposure time, said automatic exposure control circuit means including photoelectric means responsive to the illumination at the object to be photographed, a third constant voltage source means, a control transistor coupled between said photoelectric means and said third constant voltage source means, and manually operable means connected to said third constant voltage source means for setting the voltage level of said third constant voltage source means in accordance with exposure determining factors.

11. The combination of claim 10 and wherein said first, second and third constant voltage source means have their respective transfer functions equal.

* * * * *